May 31, 1966 A. D. RITTMANN ETAL 3,253,319

RECTIFIER AND PROCESS FOR FABRICATING SAME

Filed Sept. 24, 1962

INVENTORS
Albert D. Rittmann,
Timothy J. Desmond, II
& Donald E. Lake

BY Robert E. Fowler

ATTORNEY

United States Patent Office 3,253,319
Patented May 31, 1966

3,253,319
RECTIFIER AND PROCESS FOR FABRICATING SAME

Albert D. Rittmann, Timothy J. Desmond II, and Donald E. Lake, Kokomo, Ind., assignors to General Motors Corporation, Detroit, Mich., a corporation of Delaware
Filed Sept. 24, 1962, Ser. No. 225,485
3 Claims. (Cl. 29—25.3)

This invention relates to an improved rectifier and method for fabricating the same. Rectifiers fabricated of semiconductive materials are being utilized in industry to a greater and greater extent. However, the cost of these rectifiers is still somewhat high even though production is in ever increasing numbers. One of the reasons for the high cost of these devices is the large number of steps required in the process of fabricating the same, and the care necessary in producing each part together with the difficulty involved in handling small parts.

It is currently the practice to procure a semiconductor member usually in the form of a thin wafer or disc and to alloy or diffuse into the disc impurities which produce therein a P-N junction, together with a reduction in the resistivity of another portion of the wafer. For example, a basically N-type wafer of silicon might have diffused or alloyed into opposite faces thereof impurities rich in phosphorus on one side and on the other side in boron in order to provide N+, N and P type areas. This provides the basic P-N junction for the rectifier and at the same time reduces the resistivity in the part of the wafer remote from the junction to increase current flow. After this wafer has been fabricated, which requires a considerable amount of care, it is then sometimes pre-assembled by soldering it to other protective sheets, this subassembly being then soldered into an aperture in a casing. It then has its other electrode secured to the available surface, next is potted to keep out moisture, and lastly has its open face hermetically sealed with the terminal projecting therethrough to complete the device. As can easily be seen all of these steps are time consuming and costly and, since the parts fabricated are relatively small, are difficult to handle. It is necessary to fire or heat the basic wafer in order to alloy or diffuse in the first instance. It is necessary to add additional heat to solder and seal and thus the cost cannot be reduced beyond a certain minimum for this type of assembly.

It is an object in making our invention to provide a new method for simultaneously securing together the necessary parts for a diode and alloying or diffusing the impurities into the semiconductor wafer to produce the P-N junction.

It is a further object in making our invention to provide a "one shot" method for simultaneously producing the P-N junction in a semiconductor wafer and securing together all the necessary parts of a diode with one firing or heating step.

It is a still further object in making our invention to provide a novel semiconductive rectifier of simple construction and low cost.

With these and other objects in view which will become apparent as the specification proceeds, our invention will be best understood by reference to the following specification and claims and the illustrations in the accompanying drawings, in which:

Figure 3:
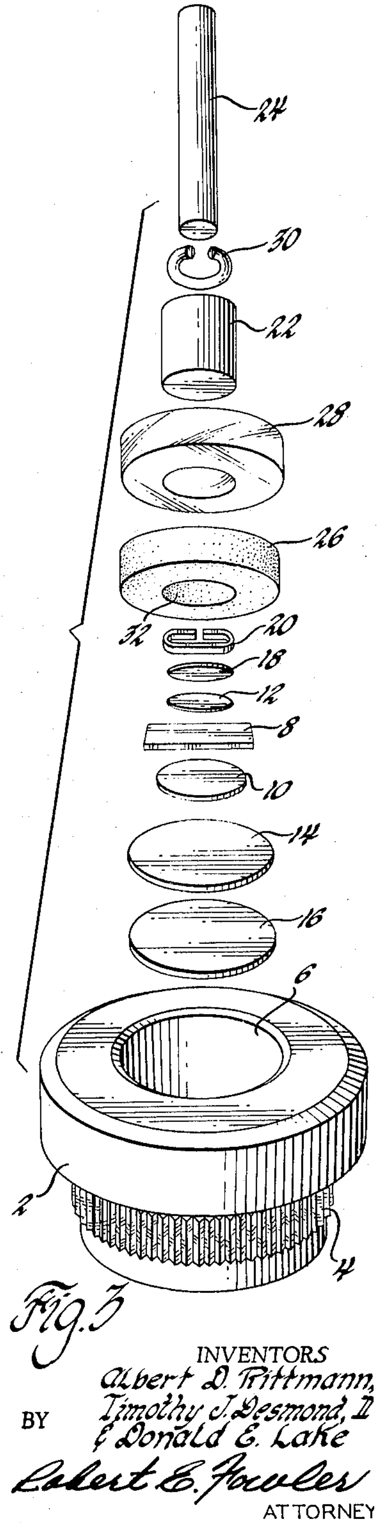

Referring now more particularly to FIG. 3 of the drawings, there is shown therein a metal casing 2 whose configuration depends entirely upon the end use of the diode. This casing can be formed so that it may be pressed into a cavity in the device with which it is to be used. In the present instance the case is shown as being cylindrical in shape and knurled at 4 around the base so that it can be pressed into a toothed hole in some machine base for support. This type of casing is currently being used in automotive rectifiers where the rectifier is forced into a knurled opening in the housing of the alternator to be connected into its circuit. The casing 2 has a central bore or aperture 6 in which the actual diode will be mounted and to which an exterior connection will be made. As previously mentioned, the semiconductor diode consists basically of a wafer such as shown at 8 of semiconductive material such, for example, as silicon or germanium. In the present instance let it be assumed that a silicon wafer is provided which is of N-type conductivity. By present processes this wafer would be normally treated either by alloying or diffusing into the opposite surfaces impurity ingredients to produce a P-type surface on one side and an N+ type area on the opposite side.

In the completed article the case may be either positive or negative depending upon the use to which the diode is to be put. It is, therefore, necessary to place in juxtaposition to the wafer 8 both above and below small sheets of impurity materials which will alloy with the silicon wafer and produce the conductivity type areas in the same at elevated temperatures when the device is fired. If it is assumed that it is desired that the case be positive in use, then the preform 10 which will rest below the wafer 8 in the assembly may be of gold and antimony, for example, 99% gold and 1% antimony. To match this the opposite disc 12 above would be aluminum. If it is desired that the case be negative, then these two discs are reversed.

The casing 2 may be of various materials which are good electrical and heat conducting such, for example, as cold rolled steel which has good characteristics in both fields and is relatively inexpensive. In order to secure the P-N diode to the bottom of the aperture in the casing it is desired to provide both means for securing the same and also to match the co-efficients of expansion of the silicon disc 8 to that of the cold rolled steel casing. Thus, there is inserted a disc 14 of some material having both good electrical and heat conducting characteristics and also having a co-efficient of expansion which will lie between that of silicon and cold rolled steel to tend to match the co-efficients of expansion of the two parts so they will not tear apart upon repeated heat cycles. The disc 14, therefore, may be of such a material as tungsten when 10 is gold or molybdenum when 10 is aluminum depending upon polarity. In order to secure this assembly to the bottom of the aperture 6 a brazing preform 16 is first inserted which may be of any soldering or brazing alloy which is capable of attaching itself to the adjacent members. Such an alloy might be one of high silver content, for example, one of 28% copper, 71.2% silver and .75% nickel.

To secure the top of the diode wafer to an insulated terminal a disc 18, which again may be of different materials depending upon polarity, is used. For example, if the case is to be positive, a molybdenum disc may be used at 18, or if negative, a tungsten disc may be used at this point. Next in order of assembly, there is a connecting deformable metal strap 20 clad with a suitable brazing alloy which rests on top of the disc 18 and connects the same to the lower end of the center post 22 which eventually forms a part of the lead 24. In order to insulate the center post from the sides of the casing a circular insulator 26 is used which surrounds the center post 22 and extends to the inner wall of the aperture 6 and above this a similarly shaped glass bead member 28 is utilized for the same purpose and also to seal the sides of the aperture when the temperature is raised. A brazing or soldering ring or preform 30 is used around the lower end of the terminal lead 24 to secure the same to the center post 22 at elevated temperatures.

Figure 1:
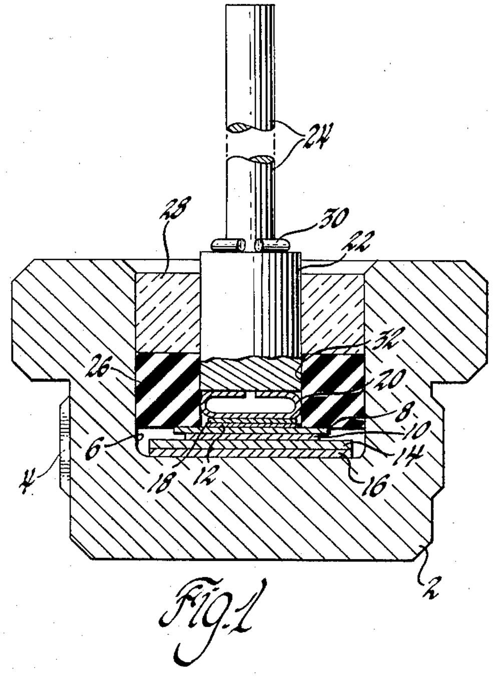
FIGURE 1 is an enlarged vertical section taken through an assembled diode before the parts have been fired.

Prior to assembling these parts in the order in which they are shown in FIG. 3, each is carefully cleaned and prepared before such assembly. Then the brazing preform 16 is dropped into the bottom of the aperture 6 first, followed by the matching disc 14 of either tungsten when 10 is gold or molybdenum when 10 is aluminum and then in the order shown, the disc impurity 10 and the semiconductor silicon wafer 8. Next the insulating cylinder 26 is dropped on the upper face of the silicon wafer 8, then into the central aperture 32 of the insulator 26 there are deposited the upper impurity disc 12 of aluminum or gold and the matching disc 18. On the upper surface of the matching disc 18 there is deposited the connecting strap 20. Then the center post 22 is dropped into the central opening on top of the upper surface of the connecting strap 20 and the insulating bead 28 is put in place. The lead terminal 24 is supported on top of the center post 22 and a brazing preform or solder ring 30 encircles the lower end of the lead 24. This assembly is best shown in FIG. 1 and shows all the parts in place and ready to be fired. The assembly is then placed in a furnace and fired at an elevated temperature, for example 850° C. in a suitable atmosphere, such as nitrogen, for a short period of time until the alloying has become effective and the members have become soldered and brazed together. It is then removed and allowed to cool to approximately 200° C. at a suitable rate and then cooled to room temperature. At the conclusion of this process the steel base is plated with nickel or zinc to protect the same for commercial use.

Figure 2:
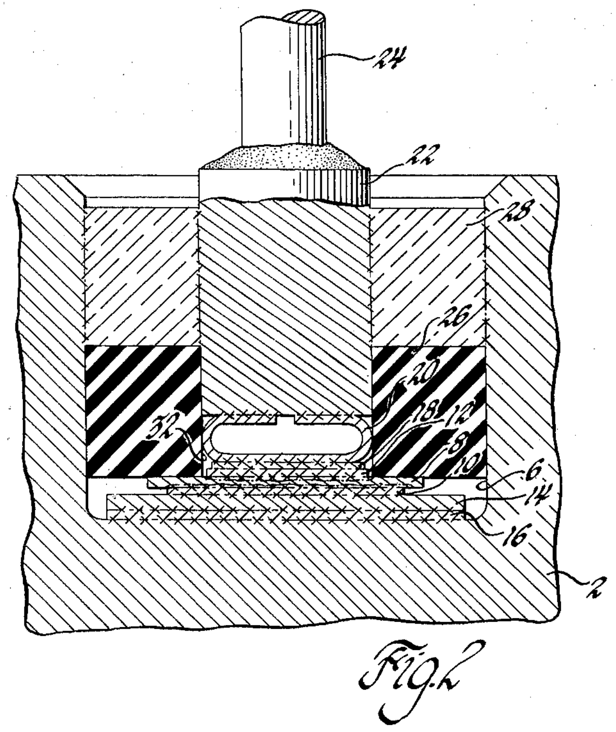
FIG. 2 is a further enlarged vertical section taken through a diode after the parts have been fired and the assembly is completed; and, FIG. 3 is an exploded view of the various parts of the diode showing their relationship.

FIG. 2 shows the parts after firing and in assembled relation. By the use of this process only one firing step is necessary to produce a completed rectifier assembly from original basic elements and it is not necessary to first form a P-N wafer which in itself is time consuming and costly prior to the assembly of such a unit into a base.

What is claimed is:

1. In a process of fabricating rectifiers, the steps of placing a solder containing a first conductivity determining impurity in a recess of a housing member, placing a semiconductor wafer in said recess on said solder, closely fitting an insulating member having a generally central aperture therein in the recess over said semiconductor wafer, said aperture exposing a selected portion of said wafer, placing a solder containing a second conductivity determining impurity, opposite from said first impurity, on the wafer portion exposed within the aperture in said insulator, placing one end of a conductive terminal member in said aperture over said solder, placing an annular glass sealing element corresponding to said insulator in said recess on said insulator around said terminal, and heating the assembly thus formed to simultaneously alloy the impurities of said solders into the semiconductor wafer and create a P-N junction, solder the components in the recess together, and seal the top of the recess around said terminal member.

2. In a process of fabricating rectifiers, the steps of placing a solder in a recess of a housing member, placing a sheet of temperature compensating material in said recess on said solder, placing a solder containing a first conductivity determining impurity in said recess on said sheet, placing a semiconductor wafer in said recess on said solder, closely fitting an insulating member having a generally central aperture therein in the recess over said semiconductor wafer, said aperture exposing a selected portion of said wafer, placing a solder containing a second conductivity determining impurity, opposite from said first impurity, on the wafer portion exposed within the aperture in said insulator, placing a sheet of temperature compensating material on said solder in said aperture, placing a solder coated flexible connector on said sheet, placing one end of a conductive terminal member in said aperture on said flexible connector, placing an annular glass sealing element corresponding to said insulator in the recess on said insulator around said terminal, and heating the assembly thus formed to simultaneously alloy the impurities of said solders into the semiconductor wafer and create a P-N junction, solder the components in the recess together, and seal the top of the recess around said terminal member.

3. The method as defined in claim 2 wherein the solder containing the first conductivity determining impurity is aluminum and the solder containing the second conductivity determining impurity is a gold-antimony alloy.

References Cited by the Examiner

UNITED STATES PATENTS

| | | | |
|---|---|---|---|
| 3,030,558 | 4/1962 | Berg et al. | 317—234 |
| 3,059,157 | 10/1962 | English et al. | 317—234 |
| 3,110,080 | 11/1963 | Boyer | 29—25.3 |
| 3,115,694 | 12/1963 | Emeis | 29—25.3 |
| 3,120,052 | 2/1964 | Zielasek | 29—25.3 |

RICHARD H. EANES, Jr., *Primary Examiner.*

JAMES D. KALLAM, *Examiner.*

A. S. KATZ, *Assistant Examiner.*